United States Patent
Al-Nakhli et al.

(10) Patent No.: US 11,208,877 B2
(45) Date of Patent: Dec. 28, 2021

(54) REMOVAL OF WATER BLOCKAGE IN TIGHT GAS RESERVOIR USING THERMOCHEMICAL FLUIDS

(71) Applicants: Saudi Arabian Oil Company, Dhahran (SA); KING FAHD UNIVERSITY OF PETROLEUM AND MINERALS, Dhahran (SA)

(72) Inventors: Ayman Al-Nakhli, Dhahran (SA); Amjed Mohammed Hassan, Dhahran (SA); Alade Olalekan Saheed, Dhahran (SA); Mohamed Ahmed Nasr Eldin Mahmoud, Dhahran (SA)

(73) Assignees: SAUDI ARABIAN OIL COMPANY, Dhahran (SA); KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/840,081

(22) Filed: Apr. 3, 2020

(65) Prior Publication Data
US 2021/0310344 A1    Oct. 7, 2021

(51) Int. Cl.
*E21B 43/24* (2006.01)
*E21B 49/00* (2006.01)
(Continued)

(52) U.S. Cl.
CPC .............. *E21B 43/24* (2013.01); *C09K 8/528* (2013.01); *E21B 36/008* (2013.01); *E21B 37/06* (2013.01); *E21B 49/008* (2013.01)

(58) Field of Classification Search
CPC ........ E21B 43/24; E21B 36/008; E21B 37/06; E21B 49/008; C09K 8/528
See application file for complete search history.

(56) References Cited

U.S. PATENT DOCUMENTS

| | | |
|---|---|---|
| 4,178,993 A | 12/1979 | Richardson et al. |
| 4,219,083 A | 8/1980 | Berkshire et al. |

(Continued)

FOREIGN PATENT DOCUMENTS

| | | |
|---|---|---|
| CA | 2628645 A1 | 3/2008 |
| CN | 102086388 A | 6/2011 |

(Continued)

OTHER PUBLICATIONS

Ashton et al., "In-Situ Heat System Stimulates Paraffinic-Crude Producers in Gulf of Mexico", SPE Production Engineering, pp. 157-160, May 1989.

(Continued)

*Primary Examiner* — Silvana C Runyan
(74) *Attorney, Agent, or Firm* — Bracewell LLP; Constance G. Rhebergen; Kevin R. Tamm (57) ABSTRACT

Methods, systems, and compositions for increasing hydrocarbon production from a wellbore where the wellbore or a nearby hydrocarbon reservoir is suffering from water blockage, one method including identifying water blockage in a rock sample of a formation via increased capillary pressure in the rock sample; formulating an exothermic reaction component to remove water blockage from a reservoir rock in situ via heat and pressure release, the reservoir rock type the same as the rock sample; injecting the exothermic reaction component into the wellbore; and allowing the exothermic reaction component to react to remove water blockage in situ to decrease capillary pressure of the reservoir rock without substantially changing porosity of the reservoir rock.

37 Claims, 3 Drawing Sheets

(51) Int. Cl.
*E21B 37/06* (2006.01)
*E21B 36/00* (2006.01)
*C09K 8/528* (2006.01)

(56) References Cited

U.S. PATENT DOCUMENTS

| | | | |
|---|---|---|---|
| 4,330,037 | A | 5/1982 | Richardson et al. |
| 4,399,868 | A | 8/1983 | Richardson et al. |
| 5,639,313 | A | 6/1997 | Khalil |
| 9,334,721 | B2 | 5/2016 | Al Dahlan et al. |
| 9,488,042 | B2 | 11/2016 | Al-Nakhli et al. |
| 9,556,718 | B2 | 1/2017 | Al-Dahlan et al. |
| 9,701,894 | B2 | 7/2017 | Al-Nakhli et al. |
| 9,976,073 | B2 * | 5/2018 | Salla ............... C09K 8/72 |
| 10,053,614 | B2 | 8/2018 | Al-Nakhli et al. |
| 10,151,186 | B2 | 12/2018 | Al-Nakhli |
| 10,358,902 | B2 * | 7/2019 | Al-Mulhem ....... C09K 8/62 |
| 2013/0126169 | A1 * | 5/2013 | Al-Nakhli ......... C09K 8/68 166/300 |
| 2017/0101577 | A1 * | 4/2017 | Al-Dahlan ........ C09K 8/72 |
| 2019/0270925 | A1 * | 9/2019 | Mahmoud ......... C09K 8/265 |
| 2020/0095853 | A1 * | 3/2020 | Al-Nakhli ........ E21B 43/16 |

FOREIGN PATENT DOCUMENTS

| | | |
|---|---|---|
| CN | 102942914 A | 2/2013 |
| WO | 2013078306 A1 | 5/2013 |
| WO | 2013078369 A1 | 5/2013 |
| WO | 2013109768 A1 | 7/2013 |
| WO | 2013181229 A2 | 12/2013 |
| WO | 2017079386 A1 | 5/2017 |

OTHER PUBLICATIONS

Assiri et al., "The Water Blockage Effect on Desiccated Tight Gas Reservoir", SPE International Symposium and Exhibition on Formation Damage Control, USA, SPE 168160, 2014.

Bahrami et al., "Water blocking damage in hydraulically fractured tight sand gas reservoirs: An example from Perth Basin, Western Australia", Journal of Petroleum Science and Engineering, 88-89, pp. 100-106, 2012.

Bennion et al., "Formation Damage Issues Impacting the Productivity of Low Permeability, Low Initial Water Saturation Gas Producing Formations", Journal of Energy Resources Technology, vol. 127, pp. 240-246, Sep. 2005.

Bennion et al., "Low Permeability Gas Reservoirs: Problems, Opportunities and Solutions for Drilling, Completion, Stimulation and Production", SPE-35577, SPE Gas Technology Conference, Calgary, Canada, 1996.

Bertoncello et al., "Imbition and Water Blockage in Unconventional Reservoirs: Well-Management Implications During Flowback and Early Production", SPE-167689, Reservoir Evaluation & Engineering, pp. 197-506, Nov. 2014.

Hassan et al., "Permanent Removal of Condensate Banking in Tight Gas Reservoirs Using Thermochemicals", SPE International, Society of Petroleum Engineers, SPE-193609-MS, 2019.

Hassan et al., "Water blockage removal and productivity indez enhancement by injection thermichemical fluids in tight sandstone formations", Journal of Petroleum Science and Engineering, 182, 2019.

U.S. Appl. No. 16/817,305, "Systems, Methods, and Compositions for Reservoir Stimulation Treatment Diversion Using Thermochemicals", filed Mar. 12, 2020.

International Search Report and Written Opinion of PCT Application No. PCT/US2021/025460 dated Jul. 16, 2021: pp. 1-11.

* cited by examiner

REMOVAL OF WATER BLOCKAGE IN TIGHT GAS RESERVOIR USING THERMOCHEMICAL FLUIDS

BACKGROUND

Field

The present disclosure relates generally to the enhanced recovery of hydrocarbons in a hydrocarbon-bearing formation via removal or reduction of water blockages. Specifically, the disclosure relates to the use of exothermic thermochemicals in situ to remove water blockages in tight gas formations.

Description of the Related Art

A tight gas reservoir is characterized in part by greater capillary pressure and greater irreducible water saturation compared to conventional gas reservoirs, and these properties are partially due to lesser permeability of the rock, typically less than about 0.5 or 1 milliDarcy (mD). Water blockage is considered a potential damage issue in gas reservoirs, specifically tight gas reservoirs. Existing methods to remove or reduce water blockages include increasing the capillary number of the blocking fluid by using chemicals such as surfactants or solvents. The effectiveness of these methods depends on the specific conditions of reservoir permeability, temperature, and pressure.

Specifically, in lesser-pressure, lesser-permeability gas formations, evaporative-alcoholic acid systems are recommended because they promote water vaporization in the produced gas at pressures less than about 1,000 pounds per square inch gauge (psig) and at about 90° Centigrade (° C.). However, ineffective chemical penetration hinders the efficiency of such remediation methods, especially in lesser-permeability, depleted tight gas reservoirs.

Water blockage results from an increase in water saturation in the near-wellbore area that is inadvertently caused by the invasion of water-based drilling or completion fluids, or from fingering or coning of formation waters. Essentially, the mechanism includes exposure of the near-wellbore area to a relatively greater volume of filtrate from the drilling fluid, swelling of formation clay crystal, and the subsequent decrease in relative permeability of the hydrocarbon (gas or oil) to be extracted.

Thus, water blockage constitutes a formation impairment problem and may result in a net loss in well productivity with a greater water-to-oil ratio for some period after the start of production. For example, a water-to-oil ratio that would result in a net loss in well productivity is around 40:60, volume of water to volume of oil. These problems can be exacerbated in tight gas reservoirs. As noted, a tight gas reservoir is a lesser-permeability reservoir, typically less than about 0.5 or 1 mD. As a result, this kind of reservoir tends to have greater capillary pressure and greater irreducible water saturation than a conventional reservoir. Water blockage causes serious reduction in well productivity in such reservoirs.

Existing water blockage clean-up strategies are technically dependent on the increase in capillary number by reducing the viscous force of the blocking fluid. These methods generally employ chemicals such as solvents, in addition to or alternative to alcohol, to alter the phase behavior of the blocking water. These methods can reduce the surface or interfacial tension of the blocking fluid, solubilize the blocking fluid, in addition to or alternative to cause vaporization of the blocking fluid, and subsequently remove water blockages from the reservoir through a wellbore. In lesser-pressure, lesser-permeability gas formations, alcoholic acid systems are recommended because they promote water vaporization in the produced gas. However, such systems can be ineffective in lesser-permeability tight gas reservoirs Tight gas reservoirs can have production problems due to lesser matrix permeability and unique damage mechanisms caused during well drilling, completion, stimulation, and production. In general, for tight sand gas reservoirs that are water-wet in nature, the average pore throat radius can be small, and therefore the average pore throat radius may create potential capillary pressure energy suction. As a result, liquid can be imbibed and held in the capillary pores, and this may cause critical water saturation. For oil reservoirs, critical water saturation is about 0.30, or a 30:70 water-to-oil volume ratio. For gas reservoirs, the critical water saturation is about 0.40, or a 40:60 water-to-gas volume ratio.

Generally, three categories of correction methods have been successfully applied in the field to remediate formation damage caused by water blockage. These include: (i) surging or swabbing wells to increase the capillary number temporarily; (ii) reducing surface tension through the addition of surfactants or solvents, which also has the net effect of increasing the capillary number by reducing the interfacial tension between the hydrocarbon and water phases so that the water blockage may be cleaned up during flowback; and (iii) use of solvents or mutual solvents, such as alcohols, to solubilize water and remove it through a change in phase behavior and subsequently increase the capillary number. The use of one method instead of another depends, in part, on the specific conditions of reservoir permeability, temperature, and pressure. However, improved compositions, systems, and methods are needed for water blockage removal from tight gas reservoirs.

SUMMARY

Applicant has recognized a need for compositions, systems, and methods for water blockage identification and removal that are less affected by and less sensitive to the permeability or porosity of the reservoir in lesser-permeability tight gas reservoirs. The present disclosure shows compositions, systems, and methods for water blockage reduction or removal in hydrocarbon-bearing reservoirs, for example, tight gas reservoirs, with lesser permeability and suffering from water blockage. One or more exothermic reaction component is pumped or injected into a wellbore in addition to or alternative to a formation suffering from water blockage, for example, before, during, or after hydraulic fracturing, or in the absence of hydraulic fracturing. An open-hole or cased-hole recovery well can be used to inject the exothermic reaction component to create microfractures in the rock of a formation.

Tight gas reservoirs are characterized in part by greater capillary pressure and greater irreducible water saturation compared to conventional gas or oil reservoirs due to lesser permeability, typically less than about 0.5 or 1 milliDarcy (mD). Water blockage is considered a critical damage issue in this type of reservoir. Prior art compositions and methods have been employed to increase reservoir capillary numbers with limited success. Embodiments of the present disclosure show the application of thermal energy to remove or reduce water blockages by in situ heat and pressure generation from exothermic chemical reactions generated downhole by an exothermic reaction component. Heat and pressure generated downhole reduce viscosity of blocking fluids, for example, water, in addition to or alternative to other blocking fluids like condensates, increase the capillary number, cause water vaporization, and remove water blockages more effectively than existing methods.

Formation damage refers generally to the impairment of the permeability of hydrocarbon-bearing formations by various adverse processes. Water blockage, in this context, is an impairment to the reservoir, which may be caused by invasion of wellbore fluids used during drilling, completion, and workover operations. Water blockage, then, represents a zone of reduced permeability within the vicinity of the wellbore as a result of water invasion into the reservoir rock. In this region, the relative permeability to hydrocarbon phases is decreased, and this results in a net loss in well productivity. Furthermore, in situations where a fresh-water filtrate invades reservoir rock, swelling of clay is induced. This reduces or totally blocks hydrocarbon flow from throat areas and causes an increase in water saturation (decrease in rock relative permeability to hydrocarbons). As a consequence, well productivity is reduced.

Blocking fluids such as water are identified with decreased capillary number. Capillary number is used in the analysis of fluid flow and is defined as the ratio of surface or interfacial tension forces (capillary forces) to viscous forces, shown by Equation 1:

$$N_C = \frac{(\mu v)}{\sigma} \quad \text{Eq. 1}$$

In Equation 1, $N_C$ is capillary number, and $\mu$, $v$, and $\sigma$ are the fluid dynamic viscosity, fluid velocity, and the surface or interfacial tension, respectively. In Eq. 1, $N_c$ (capillary number) is dimensionless (–), $\mu$ is generally represented in milliPascals×seconds (mPa·s), v is generally represented in meters/second (m/s), and $\sigma$ is generally represented in Newtons/meter (N/m).

For a flowing liquid, if $N_C \gg 1$, then viscous forces dominate over interfacial forces; however, if $N_C \ll 1$, then viscous forces are negligible compared with interfacial forces. Capillary numbers are usually greater for greater-speed flows and lesser for lesser-speed flows; thus, typically for flow through pores in a reservoir $N_C$ is about $10^{-6}$, and for flow in production tubulars $N_C$ is about 1.

Water blockages can persist in tight gas reservoirs due to greater capillary forces as compared to viscous forces. Thus, water blockage problems are prominent for lesser-permeability and depleted gas wells in which the capillary number is significantly less than 1.

For the present disclosure, nuclear magnetic resonance (NMR) testing was conducted to evaluate water saturation and porosity of core samples before and after thermochemical treatment. Results show that water saturation is significantly, surprisingly, and unexpectedly reduced after treatment (for example, where permeability of the reservoir rock near the wellbore is increased by at least about 30%) with the thermochemical materials employed allowing increased permeability to hydrocarbon flow. NMR tests also show no significant change in the porosity of the core samples before and after treatment (for example, no significant damage to the reservoir rock via a substantial change in porosity, the change in porosity being less than about 20%). Therefore, water blockage can be removed using compositions, systems, and methods of the disclosure without serious damage to reservoirs after the treatment, for example, tight gas reservoirs.

Thermal energy generated in situ and downhole from exothermic chemical reactions stimulates hydrocarbon production from a reservoir by reducing and removing water blockages, optionally also removing other blockages such as condensates. Heat generated downhole reduces viscosity of blocking fluids, increases the capillary number, causes water vaporization, and removes water blockages surprisingly and unexpectedly effectively.

The present disclosure provides well remediation methods after invasion by water, or in other words permeability improvement to hydrocarbons by removal of water blockages. In some embodiments of the present disclosure, exothermic thermal chemical fluids can be disposed in the wellbore or proximate the wellbore to react and generate a specific amount of heat. The thermal treatment fluids need not be disposed in a hydrocarbon-bearing reservoir, but can be in some embodiments. From the wellbore, generated heat can propagate into a targeted formation and heat the formation and formation fluids. Therefore, water blockage viscosity will be reduced, along with viscosity of other reservoir fluids and possibly drilling fluids. Finally, the fluids can be produced through the wellbore, and the formation water blockage will be removed.

Embodiments of the present disclosure remove water blockages from all types of production wells that produce from a tight gas reservoir. Alternatively, for example, compositions and methods can be applied to injection wells to improve well injectivity by removing induced water damage from the near-wellbore region.

Induced water damage arises from operations such as drilling, completion, stimulations, or workover and can be removed utilizing disclosed treatments. Systems, methods, and compositions of exothermic thermochemical treatment can be applied for several types of reservoirs, including sandstone, carbonate, and shale reservoirs, for example, to remove water blockages.

Presented methods can be applied using different injection modes such as continuous injection, cyclic injection, or huff-and-puff injection. The type of injection method depends on the severity of water blockage and the targeted radius or region around the borehole. In some embodiments, only one application well is necessary for chemical injection and subsequent water removal and hydrocarbon production. Water blockage treatment can be conducted by disposing reactive fluids at the wellbore, then, shutting the well down for sufficient time to allow the injected fluid to increase the heat of the targeted region, and afterward, the well can be put into production to produce the accumulated water around the wellbore (in other words, the water bank).

In some embodiments, one or more exothermic reaction components of the present disclosure create small fractures (microfractures) that maximize reservoir contact with recovery laterals, and therefore improve well productivity. However, in other embodiments the use of exothermic thermochemicals in situ generates heat and pressure to reduce the viscosity of blocking fluids for removal of blocking fluids without causing fractures or microfractures. In some embodiments, the treatment compositions and methods do not substantially change the porosity of a rock formation while decreasing capillary pressure (for example, no significant damage to the reservoir rock via a substantial change in porosity, the change in porosity being less than about 20%).

In certain embodiments, the exothermic reaction component comprises an ammonium containing compound and a nitrite containing compound. Still in other embodiments, the ammonium containing compound comprises $NH_4Cl$ and the nitrite containing compound comprises $NaNO_2$. In some embodiments, a pre-selected solution pH is between 5.7 and 9. Still in other embodiments, the reservoir temperature is in a range between 48.8° Centigrade (° C.) (120° Fahrenheit (° F.)) and 121.1° C. (250° F.).

Therefore, disclosed here is a method for increasing hydrocarbon production from a wellbore where the wellbore or a nearby hydrocarbon reservoir is suffering from water blockage, the method comprising the steps of identifying a water blockage in a rock portion of a formation; formulating an exothermic reaction component to remove water blockage from a reservoir rock in situ via heat and pressure release, the reservoir rock type the same as the rock portion; injecting the exothermic reaction component into the wellbore; and allowing the exothermic reaction component to react to remove water blockage in situ to decrease capillary pressure of the reservoir rock without substantially changing porosity of the reservoir rock. In some embodiments, the step of identifying the water blockage in the rock portion includes testing for increased capillary pressure in a sample of the rock portion. In other embodiments, the step of formulating the exothermic reaction component comprises formulating the exothermic reaction component with regard to concentration, volume, and time of application to cause only microfracturing of the reservoir rock in situ in a near wellbore region.

Still in other embodiments, the step of formulating the exothermic reaction component comprises formulating the exothermic reaction component with regard to concentration, volume, and time of application to not cause fracturing of the reservoir rock in situ in a near wellbore region. In certain embodiments, the exothermic reaction component comprises ammonium ions and nitrite ions. Still in yet other embodiments, the exothermic reaction component comprises a component selected from the group consisting of: ammonium chloride, ammonium bromide, ammonium nitrate, ammonium sulfate, ammonium carbonate, ammonium hydroxide, and combinations thereof. In some embodiments, the exothermic reaction component comprises a component selected from the group consisting of: sodium nitrite, potassium nitrite, and combinations thereof. In certain embodiments, the exothermic reaction component comprises $NH_4Cl$ and $NaNO_2$.

In some embodiments, the concentration of the $NH_4Cl$ and $NaNO_2$ are about 1 molar and the $NH_4Cl$ and $NaNO_2$ are injected separately during the step of injecting and combined in situ to exothermically react. In some embodiments, the water blockage comprises brine, optionally injected brine, formation brine, or both. Still in other embodiments, the exothermic reaction component is triggered at a temperature in situ between about 50° C. and about 300° C. In certain embodiments, the exothermic reaction component is triggered at a temperature in situ between about 50° C. and about 150° C. In yet other embodiments, the hydrocarbon reservoir is a tight gas formation. Still in other embodiments, the capillary pressure of the reservoir rock is decreased by at least about 50%. In some embodiments of the method, permeability of the reservoir rock near the wellbore is increased by at least about 30%. Still in other embodiments, the step of allowing the exothermic reaction component to react to remove water blockage further comprises the step of activating the exothermic reaction component with at least one of microwaves, an acid, or combinations of the same.

In certain other embodiments, the step of injecting the exothermic reaction component into the wellbore is selected from an injection type of continuous injection, cyclic injection, huff-n-puff injection, and combinations of the same. In some embodiments, the step of identifying water blockage in the rock portion of the formation further comprises calculating capillary number of the rock portion. In some embodiments, the water blockage is removed by any one of the following: from flowing out of the wellbore, being vaporized, and combinations of the same.

Still in other embodiments, the method includes the step of testing the reservoir rock to verify decreased capillary pressure due to water blockage removal and testing the reservoir rock with nuclear magnetic resonance to verify no significant damage to the reservoir rock via a substantial change in porosity, the change in porosity being less than about 20%. In certain embodiments, the method further includes the use of concentric coiled tubing operable to inject components of the exothermic reaction component separately such that the exothermic reaction component reacts to produce pressure and heat once disposed in the wellbore. Other embodiments of the method include the steps of squeezing the exothermic reaction component into the reservoir rock after the step of injecting the exothermic reaction component into the wellbore, and soaking the reservoir rock with the exothermic reaction component for between about 3 hours and about 12 hours. Still in other embodiments, the step of squeezing the exothermic reaction component into the reservoir rock comprises the use of a water-based spacer fluid injected at between about 100 psig and about 1,000 psig.

In yet other embodiments of the method, the method includes a step of releasing the exothermic reaction component from the reservoir rock and wellbore after the step of soaking once nitrogen gas has been generated in situ, where the nitrogen gas provides lift energy to remove the water blockage from the reservoir rock through the wellbore. Still other embodiments include the step of injecting a spacer fluid. In some embodiments, the step of injecting a spacer fluid occurs before the step of injecting the exothermic reaction component into the wellbore. In other embodiments, the step of injecting a spacer fluid occurs after the step of injecting the exothermic reaction component into the wellbore. In some embodiments an aqueous exothermic reaction component is incorporated into a spacer fluid for injection with a spacer fluid. In some embodiments, the spacer fluid comprises an aqueous-based spacer fluid applied at a volume ratio of about 2:1 for the spacer fluid to the exothermic reaction component.

Still in other embodiments, the spacer fluid includes at least one component selected from the group consisting of: a clay stabilizing agent, an acidic solution, a scale inhibitor, a wettability alteration fluid, and combinations of the same. In some embodiments, the spacer fluid is injected with the exothermic reaction component to carry the exothermic reaction component for placement within the reservoir rock and hydrocarbon reservoir.

In other embodiments, the spacer fluid includes at least one component selected from the group consisting of: potassium chloride, sodium chloride, ionic liquids; and combinations of the same. Still in other embodiments, the spacer fluid includes potassium chloride at a concentration at between about 2 wt. % and about 5 wt. %. In yet other embodiments, the spacer fluid includes potassium chloride at a concentration at between about 3 wt. % and about 4 wt. %. In still other embodiments, the spacer fluid includes sodium chloride at a concentration at between about 2 wt. % and about 5 wt. %. In certain embodiments, the spacer fluid includes sodium chloride at a concentration at between about 3 wt. % and about 4 wt. %. Still in other embodiments, the spacer fluid includes ionic liquids at a concentration between about 250 ppm and about 1000 ppm. And in other embodiments of the method, the spacer fluid includes ionic liquids at a concentration between about 500 ppm and about 750 ppm.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of compositions, systems, and methods for thermochemical removal of water blockages from hydrocarbon-bearing reservoirs, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Exothermic thermochemical compositions and methods provide for effective, non-damaging water blockage treatment methods. Equations 2 and 3 help describe the effectiveness of the heat-generating reactions:

$$\varepsilon = \frac{\Delta H}{Q_t} \quad \text{Eq. 2}$$

$$Q_t = q_i + \frac{w_i}{\varphi} \quad \text{Eq. 3}$$

In Equations 2 and 3, $\varepsilon$ is the thermal efficiency, $\Delta H$ is the enthalpy change of a thermochemical reaction, $Q_t$ is total thermal energy required by the process, $q_i$ is direct thermal energy input, $w_i$ is direct useful work input, and $\gamma$ thermal energy conversion efficiency. In Equations 2 and 3, $\varepsilon$ is dimensionless (-), $\Delta H$ is represented in kiloJoules/mole (kJ/mol), $Q_t$ is represented in kJ/mol, $q_i$ is represented in kJ/mol, $w_i$ is represented in kJ/mol, and $\varphi$ is dimensionless (-).

Figure 1:
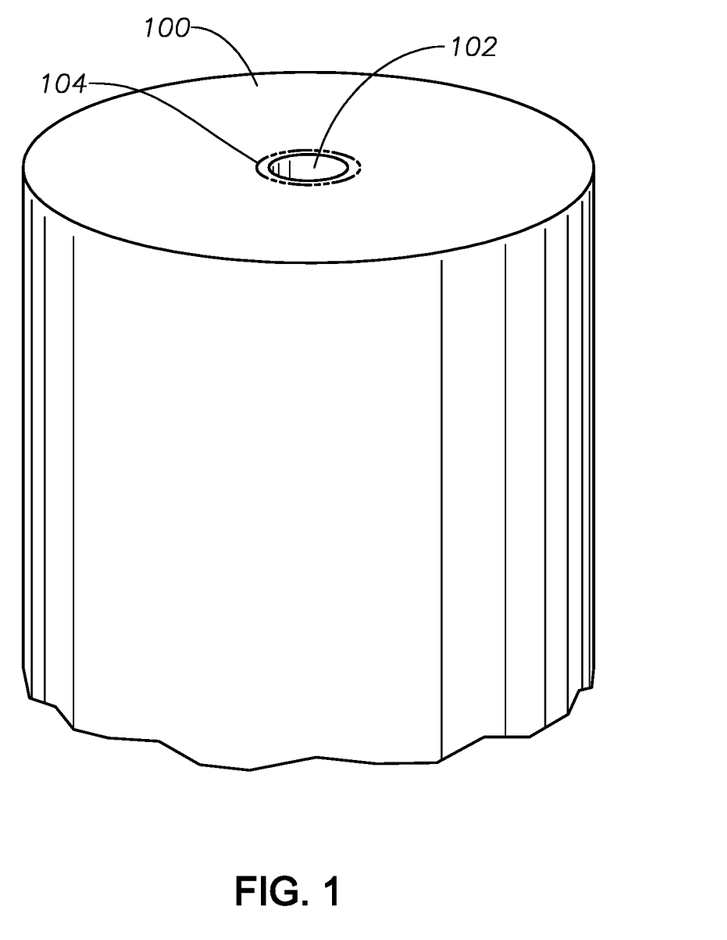
FIG. 1 is a schematic representation of a core sample with a cylindrical channel in the center.
Figure 2:
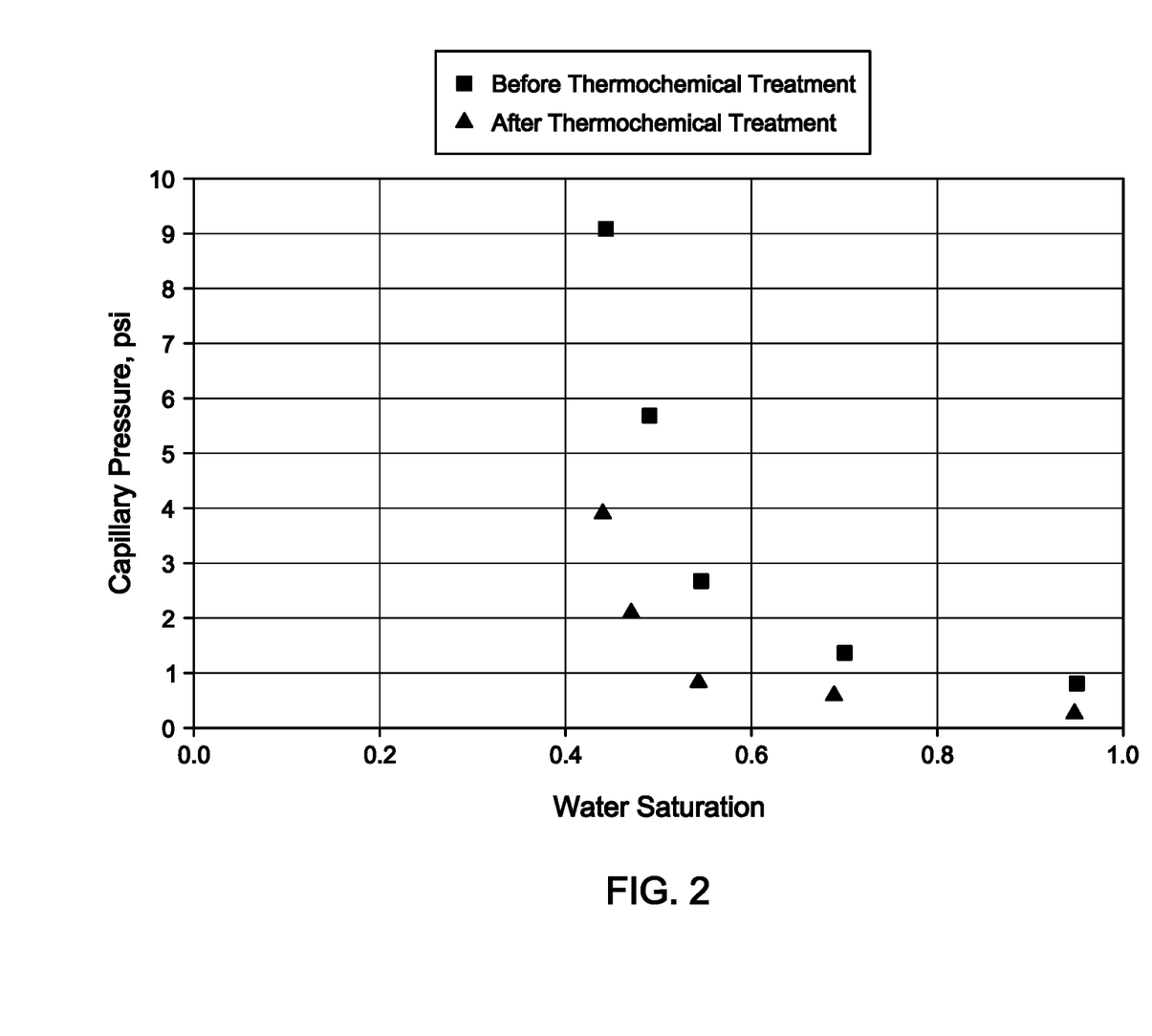
FIG. 2 is a chart showing capillary pressure before and after exothermic thermochemical treatment for the core sample shown in FIG. 1.
Figure 3:
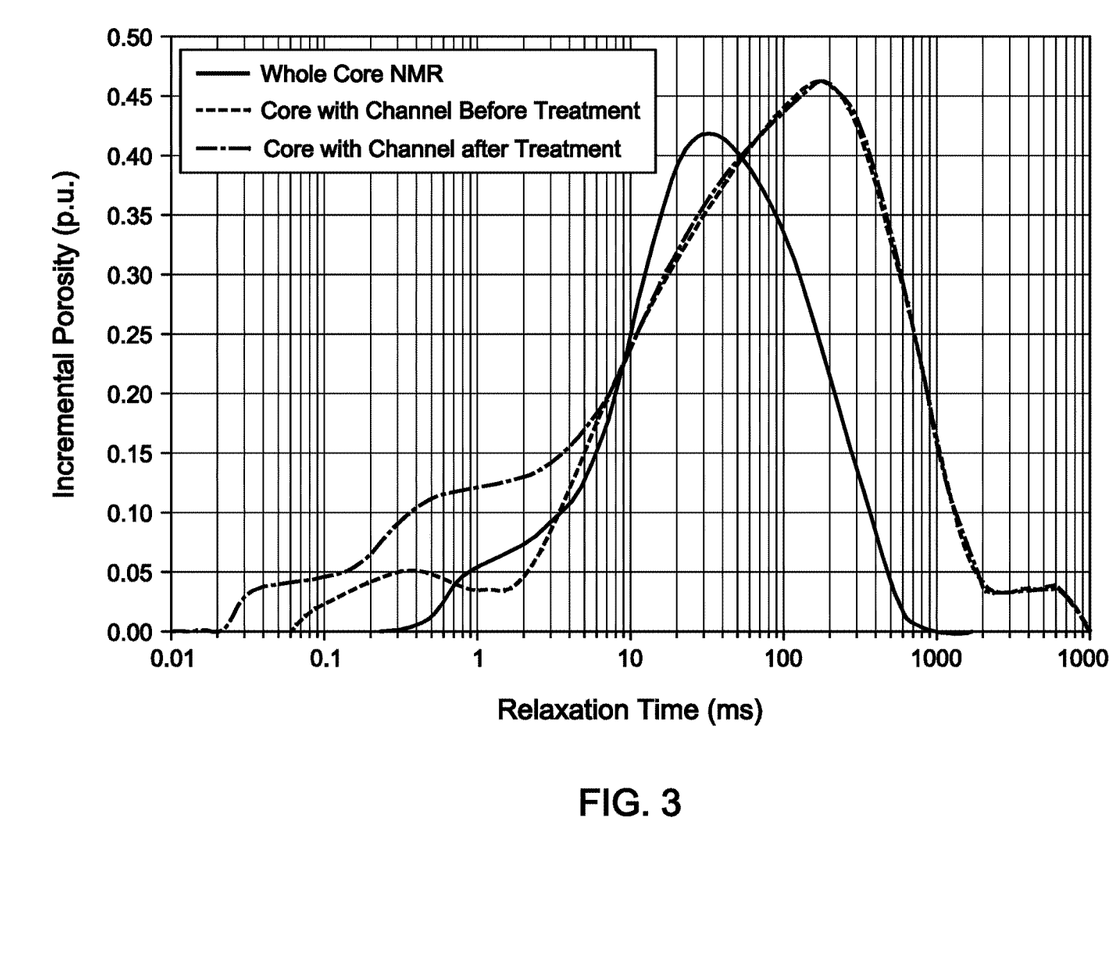
FIG. 3 is a graph showing nuclear magnetic resonance results for the whole core sample prior to thermal treatment, the core sample with the cylindrical channel before thermal treatment, and the core sample with the cylindrical channel after thermal treatment.

FIG. 1 is a schematic representation of a core sample with a channel in the center. Core sample 100 includes cylindrical channel 102. Core sample 100 was imbibed with water blockage as further described with respect to the experiments conducted. FIG. 2 is a chart showing capillary pressure before and after exothermic thermochemical treatment for the core sample shown in FIG. 1. As can be seen, the capillary pressure of the core sample advantageously decreased after treatment. FIG. 3 is a graph showing nuclear magnetic resonance (NMR) results for the whole core sample prior to thermal treatment, the core sample with a cylindrical channel before thermal treatment, and the core sample with the cylindrical channel after thermal treatment. Porosity is not significantly or negatively impacted by the treatment.

The example exothermic thermochemical treatment composition tested in the systems and methods included a reagent pairing of aqueous sodium nitrite ($NaNO_2$) and ammonium chloride ($NH_4Cl$). Equimolar concentrations (1 Molar (M) each) of reactants (about 50 milliliters (ml) total volume) were used in the experiments. The reaction is exothermic and generally proceeds as shown in Equation 4:

$$NH_4Cl_{(aq)} + NaNO_{2(aq)} \rightarrow N_{2(g)} + NaCl_{(aq)} + 2H_2O + \text{Heat} \quad \text{Eq. 4}$$

In Equation 4 a catalyst or initiator can be applied, and the catalyst or initiator can include acidic $H^+$ ions (for example, from acetic or hydrochloric acid) in addition to or alternative to heat in addition to or alternative to microwaves. As the reaction proceeds, intermediate thermolabile products are created, and these ultimately disintegrate into brine (NaCl), nitrogen gas, and steam. Berea sandstone core samples were used in the experiments, with certain properties presented in Table 1 (see also FIG. 1).

TABLE 1

Certain physical properties of the core sample of FIG. 1 before exothermic thermochemical treatment and after exothermic thermochemical treatment.

| | Core Diameter, centimeters (cm) | Core Length (cm) | Sample Bulk Volume, cubic centimeters (cc) | Sample Pore Volume (cc) | Sample Porosity % | Sample Grain Density (grams (g)/cc) | Absolute Permeability, milliDarcy (mD) |
|---|---|---|---|---|---|---|---|
| Before | 3.78 | 4.1 | 46.3 | 9.4 | 12.5 | 2.74 | 1.2 |
| After | 3.78 | 4.1 | 46.3 | n/a | 13.7 | n/a | 1.62 |

The reaction of Equation 4 in the present examples was activated by heating at a temperature between about 50° C. to about 100° C., the activation temperature being dependent in part on pH and pressure. Other methods exist for activating exothermic reactions of thermochemicals such as lowering pH or applying microwaves. Activation temperature of the exothermic reaction is pH dependent. In some embodiments, the change in porosity of rock after treatment is less than about 30%, or less than about 20%, or less than about 10% compared to the original porosity of the sample. Treatment compositions, methods, and systems of the present disclosure can be applied during or after several operations such as drilling, acidizing, and fracturing operations to reduce and remove water damage induced during and after these processes. Water blockage removal compositions, systems, and methods disclosed here can be applied to any type of well such as a production or injection well and are suitable for open-hole type wells as well as cased-hole type wells.

By creating tiny microfractures around a borehole in order to reduce capillary forces that hold fluids such as water, in addition to or alternative to vaporizing water banked in formation rock, hydrocarbon production can be increased through increased permeability. Additionally, the in situ generation of heat and nitrogen gas desiccates trapped water that invades wellbores and formations during drilling and workover operations. In some embodiments, capillary forces in rock holding water are reduced by at least about 50%, about 30%, or about 10%, and this allows trapped water to more easily flow from a formation into a wellbore for removal.

Prior to thermochemical treatment, the core samples were saturated with brine as the wetting phase in a series of core flooding experiments. The core samples were saturated using 3 grams/liter (g/l) KCl under gravity flow for 2 hours. The core was pressurized at 2,000 pounds per square inch gauge (psig) for 12 hours.

Thereafter, the core samples were treated with exothermic thermochemicals. In order to evaluate the effects of thermochemical treatment, NMR analysis was conducted on the samples to measure the porosity before and after the treatment.

Treatment parameters including chemical concentration, treatment volume, and injection duration can be selected based on the condition of the targeted zone, for example, the type, amount, and extent of water blockage. In one embodiment, if the targeted region for treatment around a wellbore is large (in other words the radius of a water bank is extensive radially outwardly around a wellbore), then chemical concentration in addition to or alternative to the treatment volume should be increased to ensure that sufficient heat of reaction will be generated in situ from an exothermic reaction, and the whole region of the water bank will be heated sufficiently. This can improve the performance of the water blockage treatment. However, a treatment can be designed to not significantly change porosity of the surrounding rock or formation.

Radial core samples were used for the studies to simulate a reservoir radial flow condition. Capillary pressure was determined by a centrifuge method as follows. The saturated cores were rotated in the non-wetting phase at increasing rotational speeds ($\omega$). The experimental data is straightforward compared to the case of linear cores. Equation 5 is used to calculate the capillary pressure at any rotation speed for the radial core, and is the same as the linear core:

$$P_C = 7.953 \times 10^{-8} \Delta\rho\omega^2 (r_o^2 - r_i^2) \qquad \text{Eq. 5}$$

In Equation 5, $\Delta\rho$ is density difference between fluids in grams per cubic centimeter (g/cm$^3$), $\omega$ is rotation speed in rotations per minute (rpm), $r_0$ is outer radius of rotation (cm), and $r_i$ is inner radius of rotation (cm).

FIG. 2 compares the core capillary pressures before and after treatment with exothermic thermochemicals at different levels of water saturation. FIG. 2 shows that there is a significant reduction in water saturation after the exothermic thermochemical treatment. T2 signal distribution of the core samples is presented in FIG. 3.

In one example, the permeability of the core increased from 1.2 to 1.62 mD, a 35% increase. Microfractures were created by the exothermic thermochemicals near the cylindrical channel, which was drilled in the middle of the core (FIG. 1). The alteration happened in a 6 millimeter (mm) diameter around the 5 mm hole. The altered permeability value in the 6 mm region was 2.2 mD according to Equation 6.

FIG. 1 shows a core sample 100 including cylindrical channel 102, and cylindrical channel 102 was used to represent a wellbore. Exothermic thermochemicals were injected inside the cylindrical channel 102 at the center. After treatment, permeability in the region proximate cylindrical channel 102, which was drilled in the middle of core sample 100, was increased from 1.2 mD to 2.2 mD due to the creation of microfractures. The diameters of cylindrical channel 102 and a defined region 104 around and proximate cylindrical channel 102 are 5 mm and 6 mm, respectively. This permeability value (2.2 mD) was determined using Equation 6. The permeability in the defined region was improved by 83% after the treatment.

$$\bar{k} = \frac{\ln(r_e / r_w)}{\sum_{All\,Layers} \frac{(\ln(r_{i+1} / r_i))}{k_i}} \qquad \text{Eq. 6}$$

Equation 6 can be used to determine the average permeability of several layers or portions. Also, it can be utilized to calculate the permeability of a certain layer or portion if other parameters are available. $\bar{k}$ is the average permeability for a defined region (mD), $r_e$ and $r_w$ are the external and the internal radii of the considered region (inches), $k_i$ is the permeability of a certain layer or portion (mD), and i is the counter index or the layer number (dimensionless).

Due to rock heterogeneity, permeability differs along the location or the distance from a core center. Here, whole permeability refers to the average permeability of the whole rock matrix from the center of the core to the edge of the core sample. A hole at the center of a rock sample can be used to represent a wellbore, then the region around the hole can be described as the near-wellbore region. The diameter of this region in the example here is 6 mm, and the permeability of this region is defined as the near-wellbore permeability.

Residual water saturation of the core samples before and after treatment with the thermochemicals show that significant reduction in water saturation was achieved. The NMR analysis and T2 signal distribution confirm that there was no significant damage to the core samples due to the treatment. Water blockage, in addition to or alternative to other blockage such as condensate, can be reduced in viscosity via thermal treatment to flow out of rock, and alternatively or additionally water and other blockages may be vaporized by the heat of the exothermic reaction. Capillary pressure is decreased without negatively impacting porosity of rock. Thermochemical treatment volume, concentration, and time of application can be designed to limit the amount of porosity change in a near-wellbore region while increasing near-wellbore permeability.

Depending on the concentration and amounts of exothermic thermochemicals used, generated pressure can create microfractures that reduce the capillary pressure in the near-wellbore and that will help eliminate water accumulation. However, in other embodiments, the concentration and amounts of exothermic thermochemicals are designed to avoid fracturing and microfracturing. Reduction of capillary pressure can be about 50%, or more than 100%, for example, an about 125% reduction. Whole permeability can increase about 10%, about 20%, or more than about 30%, and near-wellbore permeability can increase more than about 100% or more than about 180% in the near-wellbore area.

Once again, whole permeability is the total or average permeability of the whole studied region, and near-wellbore permeability is the permeability of a certain region within the studied region. The whole permeability can be determined using the conventional method of permeability measurements by utilizing Darcy's law. Near-wellbore permeability can be calculated using Equation 6, since the average permeability of the rock sample and the dimensions of the near-wellbore region are available for measurement. In FIG. 1, the whole permeability refers to the average permeability of all of the rock matrix from the center of the core to core edge, and near-wellbore permeability is the permeability of a certain region around the drilled hole in the core center (104), the diameter of the considered region is 6 mm, around a 5 mm diameter drilled hole (cylindrical channel 102).

Generated temperatures due to the thermochemical reactions were about 125° C., and the temperature reduced the water viscosity and dehydrated the rock. Temperature increase and pressure generated can be determined and designed according to reactant concentrations, volumes, and area of application in a wellbore or reservoir. Example chemical treatments of the present disclosure can be applied in wellbores and reservoirs with temperatures up to about 100° C. or 200° C., irrespective of the reservoir pressure.

Downhole steam and heat generated reduces the viscosity of blocking fluids, causes water vaporization, and by either or both mechanisms removes water blockages. Methods described here are advantageous due to better thermal conductivity of the reservoir rock compared to hydraulic conductivity when employing evaporative-alcoholic acid treatment methods. In other words, heat from thermal reactions can penetrate a tight gas reservoir better than treatment chemicals can flow into a reservoir. Methods can be applied for different types of wells such as producers or injector wells.

In some embodiments, methods of treatment for water blockages include squeezing the exothermic reaction component into the reservoir rock after the step of injecting the exothermic reaction component into the wellbore, and soaking the reservoir rock with the exothermic reaction component for between about 3 hours and about 12 hours. A variety of fluids are available and suitable to squeeze an exothermic reaction component into a target formation. Properties of suitable squeezing fluids include incompressibility and being non-corrosive. For example, aqueous-based fluids can be used to squeeze the exothermic reaction component, the aqueous-based fluid optionally adjusted for density and viscosity. Injection pressure is sufficient to squeeze the reactive chemicals inside the formations. Also, injection pressure is lesser than the fracture pressure of the formation. Injection pressure can vary between about 100 psig to about 1000 psig based on the formation permeability and the severity of water blockage damage. In some example applications, spacer fluids can be injected after the exothermic reaction component to squeeze the reactive agent into the formation, spacer fluids such as those water-based spacer fluids of Trican of Calgary, Alberta, Canada.

Suitable volume and concentration of spacer fluid application depends on the severity of a water blockage problem and the formation tightness. Volume and concentration of spacer fluids for squeezing can be increased with increasing formation tightness and water blockage severity. In one embodiment, a suitable volume of spacer fluids for squeezing treatment of an exothermic reaction component can vary between about 10 to about 100 barrels. A suitable volume ratio of spacer fluid to exothermic reaction component can be between about 1:1 and about 2:1. Surprising and unexpected advantages of using spacer fluids include improvement in the performance of thermochemical fluids by stabilizing swelling minerals in a treated formations. In other embodiments, one or more spacer fluid can be injected before an exothermic reaction component in order to stabilize the clay minerals. Also, spacer fluids can be used to dispose the reactive chemicals inside the reservoir in a targeted fashion by injecting the spacer fluids after the exothermic reaction component to place the reactive exothermic components.

In spacer fluid applications, ionic liquids are advantageous alternatives to conventional surfactants. Ionic liquids offer many advantages over conventional surfactants, such as low environmental impact, low cost, recyclability, non-corrosivity, stability, solubility in water and solvents, and their higher surface activity and ability to work in harsh environments. Organic cations such as alkyl-phosphonium, alkyl-sulphonium, N-dialkyl imidazolium, and thiazolium can be suitable in ionic liquids for use with a stabilizer or spacer fluid.

In some embodiments, a spacer fluid includes at least one component selected from the group consisting of: potassium chloride, sodium chloride, ionic liquids; and combinations of the same. These components advantageously improve the performance of exothermic reaction components. Injecting such components stabilizes swelling minerals and improves the exothermic chemical penetration inside the treated formations. Also, these components can reduce the interfacial tension between the injected chemicals and formation brine to increase the treatment efficiency.

Thermochemical systems and methods of the present disclosure can be applied in, for example, tight formations, sandstone formations, carbonate formations, and in gas wells, including those wells in unconventional reservoirs with lesser-permeability rocks. Fracturing fluids used in overbalanced drilling can be damaging to the permeability of the formation, and the disclosed systems and methods here result in enhanced productivity of gas wells, for example. An exothermic reaction component, for example, optionally containing a nitrite ion and an ammonium ion, is applied either separately or together to wellbores or reservoirs, for example, in laterals.

With concentric coiled tubing, two fluids of a thermochemical exothermic reaction component, for example, an ammonium ion containing fluid and a nitrite ion containing fluid, can be injected separately into a target wellbore or lateral and then combined to provide control over the placement of and reaction of exothermic chemicals. In some embodiments, a single exothermic reaction component can be introduced with encapsulated chemicals, such that the chemicals do not react to produce heat and pressure until they are proximate the sand face in a given lateral.

Ultra-tight formations include those reservoir rocks where permeability can be in the nano-Darcy range making production of the hydrocarbons nearly impossible without a large stimulation treatment. Generally, a standard formation has a permeability greater than about 10 mD, such as in a permeable sandstone or limestone formation. Tight formations have lesser permeability, in general less than about 1 mD, such as a tight sandstone formation. Ultra-tight formations have permeability generally less than about 0.01 mD, such as in shale formations. Treatment volume, chemical concentration, and the operation duration increase as the formation tightness increases. Among all mentioned formations, ultra-tight formation requires the highest chemical concentration, greatest treatment volume and longest treatment time. Multi-stage fracturing can reach up to 100 stages per well.

The exothermic reaction component can include one or more redox reactants that exothermically react to produce heat and increase pressure. Exothermic reaction components include urea, sodium hypochlorite, ammonium containing compounds, and nitrite containing compounds. In at least one embodiment, the exothermic reaction component includes ammonium containing compounds. Ammonium containing compounds include ammonium chloride, ammonium bromide, ammonium nitrate, ammonium sulfate, ammonium carbonate, and ammonium hydroxide. In at least one embodiment, the exothermic reaction component includes nitrite containing compounds. Nitrite containing compounds include sodium nitrite and potassium nitrite. In at least one embodiment, the exothermic reaction component includes both ammonium containing compounds and nitrite containing compounds. In at least one embodiment, the ammonium containing compound is ammonium chloride, $NH_4Cl$. In at least one embodiment, the nitrite containing compound is sodium nitrite, $NaNO_2$.

In a reaction of the exothermic reaction components according to Equation 4, generated gas can contribute to a reduction of viscosity of residual viscous materials in the fractures of a formation possibly left behind from well fracturing operations (for example, guar gum). The heat and gas generated can also reduce the viscosity of viscous hydrocarbons, for example, asphaltenes, further increasing hydrocarbon recovery. Water blockage removal occurs as discussed previously in addition to or alternative to removal of other blockage materials.

The exothermic reaction component is triggered to react. In at least one embodiment, the exothermic reaction component is triggered within a wellbore or within laterals in addition to or alternative to triggered in pre-existing fractures. In at least one embodiment of the present disclosure, an acid precursor triggers the exothermic reaction component to react by releasing hydrogen ions, and in some embodiments the acid precursor is completely consumed by the exothermic reaction such that no residual acid remains to damage the formation or the well.

In at least one embodiment, the exothermic reaction component is triggered by heat. The wellbore temperature and temperature of laterals can be reduced during a pre-pad injection or a pre-flush with brine and reach a temperature less than 120° F. (48.9° C.). An exothermic thermochemical treatment fluid of the present disclosure can then be injected into the well, and the wellbore temperature increases from the heat of the formation. When the wellbore and lateral temperatures reach a temperature greater than or equal to about 120° F., for example, or between about 50° C. to 100° C., for example, depending on the composition of the exothermic reaction component, the reaction of redox reactants is triggered. In at least one embodiment of the present disclosure, the reaction of the redox reactants is triggered by temperature in the absence of the acid precursor. In at least one embodiment of the present disclosure, the exothermic reaction component is triggered by heat when the exothermic reaction component is within multi-branched laterals, optionally proximate pre-existing fractures.

In at least one embodiment, the exothermic reaction component is triggered by pH. A base can be added to an exothermic reaction component of the present disclosure to adjust the pH to between about 9 to about 12. In at least one embodiment, the base is potassium hydroxide. The exothermic reaction component, optionally along with other components such as fracturing fluid, is then injected into the formation with the base. Following the injection of the fracturing fluid, an acid is injected to adjust the pH to less than about 6. When the pH is less than about 6, the reaction of the redox reactants is triggered. In at least one embodiment of the present disclosure, the exothermic reaction component is triggered by pH when the exothermic reaction component is within the fractures. In some embodiments, no base or basic buffer is used to control the activation or reaction of the exothermic reaction component.

Dual-string coiled tubing can be used to introduce the exothermic reaction component and the acid precursor to the wellbore and the laterals. In at least one embodiment, the exothermic reaction component includes $NH_4Cl$ and $NaNO_2$. The acid precursor can include acetic acid. In some embodiments, the acetic acid is mixed with $NH_4Cl$ and is injected in parallel with the $NaNO_2$, using different sides of the dual-string coiled tubing. The exothermic reaction component and the acid precursor can mix within the wellbore or fractures of a formation.

In methods of the present disclosure, the exothermic reaction component is mixed to achieve a pre-selected solution pH. The pre-selected solution pH is in a range of about 6 to about 9.5, alternately about 6.5 to about 9. In at least one embodiment, the pre-selected solution pH is 6.5.

In at least one embodiment, the exothermic reaction component reacts when the exothermic reaction component reaches the wellbore temperature or the formation temperature. The wellbore temperature or formation temperature can be between about 100° F. and about 250° F., alternately between about 120° F. and about 250° F., alternately between about 120° F. and about 230° F., alternately between about 140° F. and about 210° F., alternately about 160° F. and about 190° F. In at least one embodiment, the wellbore temperature is about 200° F. In at least one embodiment, the wellbore temperature at which the exothermic reaction component reacts is affected by the pre-selected solution pH and an initial pressure. The initial pressure is the pressure of the exothermic reaction component just prior to the reaction of the exothermic reaction component. Increased initial pressure can increase the wellbore temperature that triggers the reaction of the exothermic reaction component. Increased pre-selected solution pH can also increase the wellbore temperature that triggers the reaction of the exothermic reaction component.

In embodiments here, the exothermic reaction component of a thermochemical treatment method is not present at concentrations or volumes to cause pressure pulses or formation fracturing, but instead heat and steam to alter capillary pressure without significantly altering porosity.

In at least one embodiment, the method also cleans up or removes from a wellbore or formation a viscous material, for example, asphaltenes, or a residual viscous material, for example, guar.

In some embodiments, microwaves can be applied in situ to aid in triggering an exothermic reaction component.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of compositions, systems, and methods for thermochemical removal of water blockages from hydrocarbon-bearing reservoirs, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for increasing hydrocarbon production from a wellbore where the wellbore or a nearby hydrocarbon reservoir is suffering from water blockage, the method comprising the steps of:
   identifying a water blockage in a rock portion of a formation;
   formulating an exothermic reaction component to remove water blockage from a reservoir rock in situ via heat and pressure release, the reservoir rock comprising a reservoir rock type the same as the rock portion;
   injecting the exothermic reaction component into the wellbore; and
   allowing the exothermic reaction component to react to remove water blockage in situ to decrease capillary pressure of the reservoir rock without substantially changing porosity of the reservoir rock, the change in porosity being less than about 20%.

2. The method according to claim 1, where the step of identifying the water blockage in the rock portion includes testing for increased capillary pressure in a sample of the rock portion.

3. The method according to claim 1, where the step of formulating the exothermic reaction component comprises formulating the exothermic reaction component with regard to concentration, volume, and time of application to cause only microfracturing of the reservoir rock in situ in a near wellbore region.

4. The method according to claim 1, where the step of formulating the exothermic reaction component comprises formulating the exothermic reaction component with regard to concentration, volume, and time of application to not cause fracturing of the reservoir rock in situ in a near wellbore region.

5. The method according to claim 1, where the exothermic reaction component comprises ammonium ions and nitrite ions.

6. The method according to claim 1, where the exothermic reaction component comprises a component selected from the group consisting of: ammonium chloride, ammonium bromide, ammonium nitrate, ammonium sulfate, ammonium carbonate, ammonium hydroxide, and combinations thereof.

7. The method according to claim 1, where the exothermic reaction component comprises a component selected from the group consisting of: sodium nitrite, potassium nitrite, and combinations thereof.

8. The method according to claim 1, where the exothermic reaction component comprises $NH_4Cl$ and $NaNO_2$.

9. The method according to claim 8, where concentration of the $NH_4Cl$ and $NaNO_2$ are about 1 molar and where the $NH_4Cl$ and $NaNO_2$ are injected separately during the step of injecting and combined in situ to exothermically react.

10. The method according to claim 1, where the water blockage comprises brine.

11. The method according to claim 1, where the exothermic reaction component is triggered at a temperature in situ between about 50° C. and about 300° C.

12. The method according to claim 1, where the exothermic reaction component is triggered at a temperature in situ between about 50° C. and about 150° C.

13. The method according to claim 1, where the hydrocarbon reservoir is a tight gas formation.

14. The method according to claim 1, where the capillary pressure of the reservoir rock is decreased by at least about 50%.

15. The method according to claim 1, where permeability of the reservoir rock near the wellbore is increased by at least about 30%.

16. The method according to claim 1, where the step of allowing the exothermic reaction component to react to remove water blockage further comprises the step of activating the exothermic reaction component with at least one of microwaves, an acid, or combinations of the same.

17. The method according to claim 1, where the step of injecting the exothermic reaction component into the wellbore is selected from an injection type of continuous injection, cyclic injection, huff-n-puff injection, and combinations of the same.

18. The method according to claim 1, where the step of identifying water blockage in the rock portion of the formation further comprises calculating capillary number of the rock portion.

19. The method according to claim 1, where the water blockage is removed via a step selected from the group consisting of: flowing out of the wellbore, being vaporized, and combinations of the same.

20. The method according to claim 1, further comprising steps of testing the reservoir rock to verify decreased capillary pressure due to water blockage removal and testing the reservoir rock with nuclear magnetic resonance to verify no significant damage to the reservoir rock via a substantial change in porosity.

21. The method of claim 1, the method further including use of concentric coiled tubing operable to inject components of the exothermic reaction component separately, wherein the exothermic reaction component reacts to produce pressure and heat once disposed in the wellbore.

22. The method according to claim 1, wherein after the step of injecting the exothermic reaction component into the wellbore the method further comprises steps of squeezing the exothermic reaction component into the reservoir rock and soaking the reservoir rock with the exothermic reaction component for between about 3 hours and about 12 hours.

23. The method according to claim 22, where the step of squeezing the exothermic reaction component into the reservoir rock comprises use of a water-based spacer fluid injected at between about 100 psig and about 1,000 psig.

24. The method according to claim 22, wherein after the step of soaking the method further comprises a step of releasing the exothermic reaction component from the reservoir rock and wellbore once nitrogen gas has been generated in situ, where the nitrogen gas provides lift energy to remove the water blockage from the reservoir rock through the wellbore.

25. The method according to claim 1, further comprising the step of injecting a spacer fluid.

26. The method according to claim 25, where the step of injecting a spacer fluid occurs before the step of injecting the exothermic reaction component into the wellbore.

27. The method according to claim 25, where the step of injecting a spacer fluid occurs after the step of injecting the exothermic reaction component into the wellbore.

28. The method according to claim 27, where the spacer fluid comprises an aqueous-based spacer fluid applied at a volume ratio of about 2:1 for the spacer fluid to the exothermic reaction component.

29. The method according to claim 25, where the spacer fluid includes at least one component selected from the group consisting of: a clay stabilizing agent, an acidic solution, a scale inhibitor, a wettability alteration fluid, and combinations of the same.

30. The method according to claim 25, where the spacer fluid is injected with the exothermic reaction component to carry the exothermic reaction component for placement within the reservoir rock and hydrocarbon reservoir.

31. The method according to claim 25, where the spacer fluid includes at least one component selected from the group consisting of: potassium chloride, sodium chloride, ionic liquids; and combinations of the same.

32. The method according to claim 31, where the spacer fluid includes potassium chloride at a concentration at between about 2 wt. % and about 5 wt. %.

33. The method according to claim 31, where the spacer fluid includes potassium chloride at a concentration at between about 3 wt. % and about 4 wt. %.

34. The method according to claim 31, where the spacer fluid includes sodium chloride at a concentration at between about 2 wt. % and about 5 wt. %.

35. The method according to claim 31, where the spacer fluid includes sodium chloride at a concentration at between about 3 wt. % and about 4 wt. %.

36. The method according to claim 31, where the spacer fluid includes ionic liquids at a concentration between about 250 ppm and about 1000 ppm.

37. The method according to claim 31, where the spacer fluid includes ionic liquids at a concentration between about 500 ppm and about 750 ppm.

\* \* \* \* \*